June 20, 1939.   M. SHARP   2,163,471
ANTENNA FOR MOTOR VEHICLES
Filed March 15, 1938
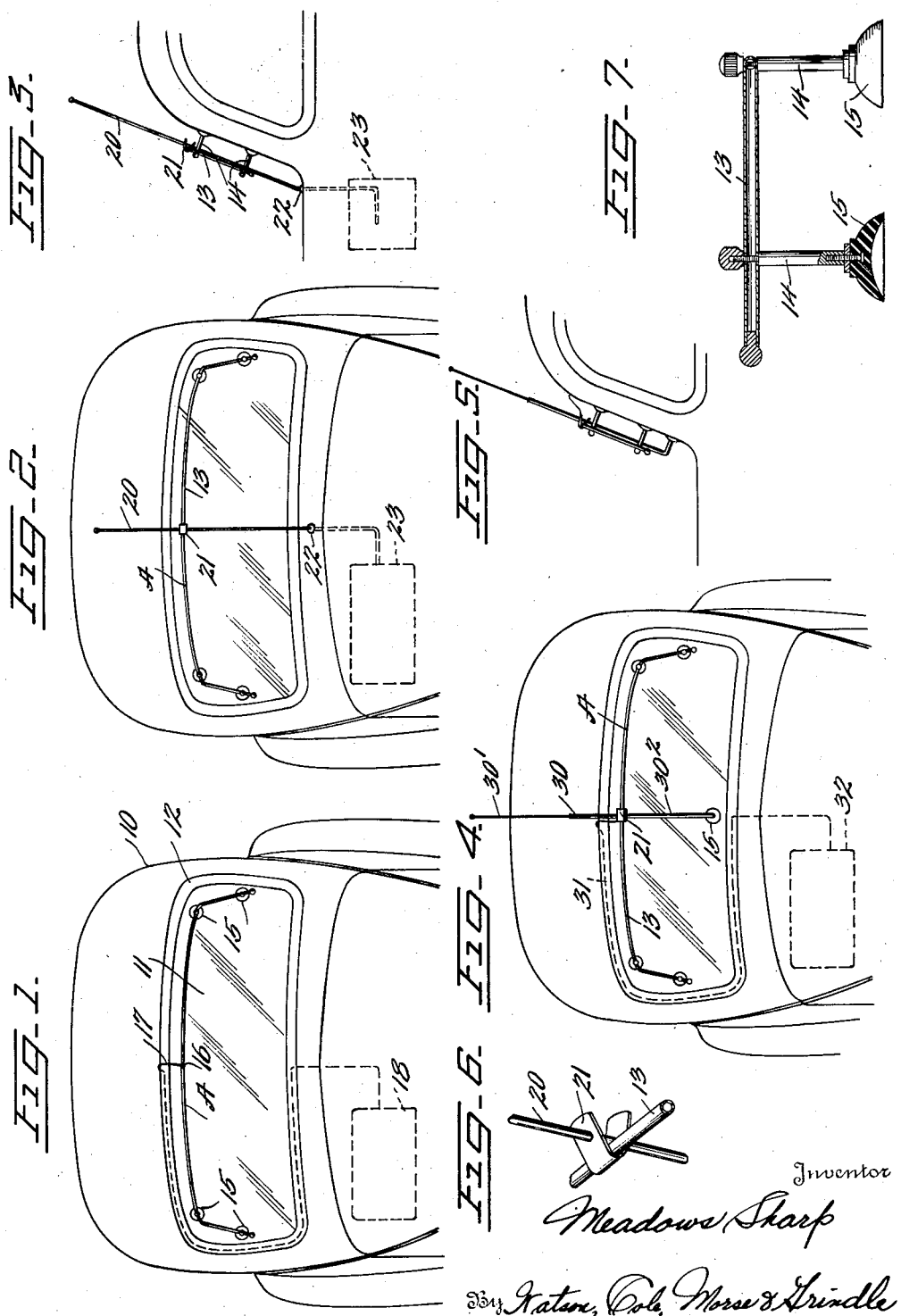
Inventor
Meadows Sharp Patented June 20, 1939

2,163,471

UNITED STATES PATENT OFFICE 2,163,471

ANTENNA FOR MOTOR VEHICLES

Meadows Sharp, Saint Catharines, Ontario, Canada

Application March 15, 1938, Serial No. 196,057
In Canada April 19, 1937

1 Claim. (Cl. 250—33)

This invention relates to an antenna or aerial for use in radio or wireless reception for automobiles where radios or wireless sets are used or operated, for a proper reception of signals, programs and other broadcast messages with the minimum amount of interference, however, caused.

The difficulties and inconveniences with many known types of ordinary radio antenna or aerials flow from the fact that interference with reception is caused by induction due to the presence of all steel roofs and bodies, these absorbing the signals, owing to insufficient insulation. To overcome these difficulties and inconveniences this invention contemplates the utilization of the glass windshield or windows of a motor vehicle as an insulating supporting base upon which the aerial is mounted and upon which it may be quickly installed where it is desired that a radio or wireless receiving set be used and operated upon a motor vehicle. By so mounting the aerial, interference due to the too close proximity of any portion of the metallic body to the aerial is avoided and signals, programs, and other broadcast messages can be received with greater clarity than with any known types of motor vehicle antenna now available.

The invention may be embodied in various modified forms of apparatus of which several are hereinafter set forth by way of example. It will be appreciated by one skilled in the art that still further changes in the specific details of the antenna may be made in adapting the same to motor vehicles having the different types of body constructions, particularly different shapes and sizes of windshield and window constructions. In every case the antenna will be so affixed to the windshield or other window of the vehicle that it lies in its entirety, or at least that portion thereof which is principally depended upon to receive the signals, within the confines of the projected area of the exposed glass surface of the window or windshield. Associated with each antenna or aerial so provided is a lead-in rod or wire and in the accompanying drawing several forms of such lead-in devices are also illustrated by way of example, the particular lead-in device to be selected and used in any particular installation depending to a large extent upon the peculiarities of the motor vehicle, the location of the radio receiving set, and the nature of the engine employed as a power plant.

In the drawing:

Figure 1 is a rather diagrammatic illustration of the upper portion of a motor vehicle body as seen from the front, showing the improved aerial mounted on such windshield, a lead-in wire and radio receiver being indicated in dotted lines;

Figure 2 is a similar view showing a lead-in rod extending more directly to the radio receiver;

Figure 3 is a side view of the vehicle shown in Figure 2;

Figure 4 is a view generally similar to Figures 1 and 2 showing the antenna mounted upon a motor vehicle windshield with a different type of lead-in;

Figure 5 is a side elevation of the same;

Figure 6 is a perspective view of a detail, on a larger scale; and

Figure 7 is a view, partially in side elevation and partially in section, and on a larger scale, of portion of the antenna.

The body of a motor vehicle of current style and design is generally indicated at 10 in the drawing and the windshield in indicated at 11, this windshield being of transparent glass. The windshield shown is of one piece extending from side to side of the car but the invention is equally applicable to windshields which comprise two separate portions angularly disposed with respect to each other and the adjacent edges of which meet, or approximately meet, at a center post which lies in the central vertical longitudinal plane of the vehicle body. The windshield frame is indicated at 12. The antenna is indicated at A and in all views it will be perceived that this antenna comprises an elongated member, which may conveniently be a solid or hollow bar or rod, the midportion of which extends transversely of the vehicle and closely parallels the upper edge of the windshield frame, the end portions extending downwardly from the midportion and approximately paralleling the side or end members of this frame. All portions of the antenna are spaced somewhat from the edge of the windshield, so that in each form of the invention the antenna may be said to lie within the confines of the projected area of the windshield. It is, however, so disposed as to interfere to a minimum extent with the forward vision of the operator and passengers of the vehicle.

The antenna comprises essentially, in addition to the rod-like member which constitutes its major element, and which is indicated at 13 in Figure 7, a plurality of supports for this member and whereby it is maintained in fixed spaced relationship to the windshield, each such support comprising a post 14 to one end of which the member 13 is attached and to the other end of which is secured a rubber suction cup 15 by means of which the post may be securely fastened to the smooth surface of the windshield in known manner. Preferably the posts are detachably connected to the elongated aerial member 13 but this is not essential and the post and member 13 may be integral if desired. By detachably connecting the member 13 to the post, however, ready disassembly of the various parts of the antenna is made easily possible.

To a binding screw 16, affixed to the antenna member 13 at approximately its midpoint is attached one end of a lead-in wire 17 and this wire extends rearwardly to the body, thence around the peripheral edge of the windshield, being retained within a suitable recess provided in the frame 12 for its reception, and finally extends downwardly to a radio receiver diagrammatically indicated at 18, its lower end being attached to this receiver. Excellent results are obtained by the use of an antenna so constructed and so mounted, particularly where the distance between the vehicle and the signal transmitting station is not unduly great.

In the case of the vehicle illustrated in Figure 2 the antenna A is formed and mounted substantially in the same manner but a lead-in rod 20 is employed instead of a lead-in wire, as in the first form of the invention. The lead-in rod 20 is preferably disposed in the vertical central longitudinal plane of the vehicle and is substantially parallel to the windshield. It crosses the antenna member 13 at approximately the midpoint of this member and the two members are secured together at this point of crossing by the clip 21, shown most clearly in Figure 6, this clip extending around the antenna member 13 and the lead-in rod 20 extending through aligned apertures formed in the legs of the clip, the clip being resilient and normally tending to spread so that the lead-in rod 20 is frictionally gripped thereby both above and below the antenna member 13. At its lower end the lead-in rod 20 projects through a rubber insulating bushing 22 positioned in an aperture formed in the cowl of the vehicle body and its lower end, below the cowl, is connected to a radio receiver such as indicated diagrammatically at 23. Any suitable form of connecting means may be employed to electrically connect the lower end of the lead-in rod and the receiver. Advantageously the lead-in rod 20 may be extended upwardly above antenna member 13, as shown in Figures 2 and 3, and the upwardly projecting portion of the lead-in rod, which is remote from the metal top of the vehicle body aids in the reception of radio signals, this form of antenna being somewhat more effective than the form first described in the interception of radio signals which come from distant points.

In Figures 4 and 5 a type of antenna is illustrated which is particularly useful for the interception of signals sent from a distance, this antenna embodying, in addition to the usual antenna member 13, a generally vertically extending member 30 of extensible type, the lower portion of this member comprising a tube and the upper portion, indicated at 30', a rod which telescopes within this tube. The tubular portion of member 30 is indicated at $30^2$ and is shown to be secured to the antenna member 13 by a clip 21, the lower end of tubular member $30^2$ being either inturned and provided with a suction cup 15 or being secured to a post such as indicated at 14 in Figure 7 to the inner end of which a suction cup is fastened. In the case of this form of the invention a lead-in wire 31 has one end connected to the clip 21 and its other end to the radio receiver 32, the wire extending around the edge of the windshield as in the form of the invention first described. This form of antenna is found particularly useful where the power plant of the motor vehicle comprises an engine of the V-type. Where a lead-in rod such as indicated in Figure 2 is employed it is sometimes discovered, where this antenna is made use of in a motor vehicle having a V-type engine that there is some interference with radio reception, due to the proximity of the lower end of the lead-in rod to the engine. By cutting off the lead-in rod and insulating its lower end, as shown in Figures 4 and 5, and making use of a lead-in wire such as indicated at 31, this interference may be avoided. Still other forms of the invention may be devised in providing antenna or aerials for use with other types of windshields. It will be clear that the antenna may be so designed and constructed as to be applicable to the rear window of the motor vehicle, which is generally maintained in fixed position. Of course it might be used with any window but naturally will not be affixed to windows which will be opened and closed by sliding.

Having thus described the invention, what is claimed as new and desired to be secured by Letters Patent is:

An antenna for use on a motor vehicle, said antenna comprising a generally horizontal member adapted to be positioned within the confines of the projected area of a window of said vehicle, a generally vertical member adapted to be insulatedly supported adjacent the bottom of said window and electrically connected to said horizontal member at the point of intersection of said horizontal and vertical members, and supporting means designed to position said horizontal member in spaced relation to the window and any metal surrounding the same, said supports engaging the glass at points spaced from the edges of said window.

MEADOWS SHARP.